United States Patent
Ragland et al.

(10) Patent No.: US 6,575,228 B1
(45) Date of Patent: *Jun. 10, 2003

(54) VENTILATING DEHUMIDIFYING SYSTEM

(75) Inventors: Ron S. Ragland, Minneapolis, MN (US); Leisha J. Rotering, Minneapolis, MN (US); Russell A. Straate, Plymouth, MN (US); Brad A. Terlson, Maple Grove, MN (US)

(73) Assignee: Mississippi State Research and Technology Corporation, Mississippi State, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/519,484

(22) Filed: Mar. 6, 2000

(51) Int. Cl.$^7$ .................................................. F24H 3/02
(52) U.S. Cl. ................................ 165/54; 165/8; 165/66; 165/59; 96/125; 96/127; 96/130; 62/94; 62/271
(58) Field of Search ................... 62/94, 271; 165/66, 165/59, 54, 8; 96/125, 127, 130, 150

(56) References Cited

U.S. PATENT DOCUMENTS

| | | |
|---|---|---|
| 2,124,932 A | 7/1938 | Stark et al. |
| 2,200,243 A | 5/1940 | Newton et al. |
| 2,237,684 A | 4/1941 | Moore |
| 2,248,225 A | 7/1941 | Fonda |
| 2,289,894 A | 7/1942 | Zuhlke |
| 2,328,974 A | 9/1943 | Guler |
| 2,471,376 A | 5/1949 | Peters |
| 2,501,280 A | 3/1950 | Kemp et al. |
| 2,561,441 A | 7/1951 | Lou |
| 2,633,928 A | 4/1953 | Chamberlain |

(List continued on next page.)

FOREIGN PATENT DOCUMENTS

| | | |
|---|---|---|
| CA | 2134168 A1 | 4/1995 |
| EP | 0297230 A | 1/1989 |
| EP | 0 462 828 A2 | 12/1991 |
| GB | 2321603 A | 8/1998 |
| JP | 4-143538 | 5/1992 |
| JP | 4-317715 | 11/1992 |
| JP | 5-200236 | 8/1993 |

OTHER PUBLICATIONS

PCT International Search Report for PCT/US 01/ 06938 Application (mailed Jul. 31, 2001).
PCT International Search Report for PCT/US 01/ 07025 Application (mailed Jul. 20, 2001).
U.S. patent application Ser. No. 09/518,924 (filed Mar. 6, 2000).

(List continued on next page.)

Primary Examiner—John K. Ford
(74) Attorney, Agent, or Firm—Piper Rudnick LLP; Steven B. Kelber

(57) ABSTRACT

A ventilation and dehumidification system for ventilating fresh air to a conditioned space. The system is comprised of a desiccant wheel for dehumidifying incoming air by exchanging moisture from an inflow current of air with an outflow current of air. The desiccant wheel is both regenerated and defrosted by a regenerative heater which is placed to heat the outflow current of air before the outflow current passes through the desiccant wheel. The system includes blowers in order to motivate the inflow and outflow currents of air. The system may also include heat recovery means such as a heat transfer wheel or a motionless heat transfer core. The blowers can be arranged so as to create an air pressure differential between the inflow chamber and the outflow chamber so that any leakage of air between the two chambers will occur from the inflow chamber to the outflow chamber.

2 Claims, 6 Drawing Sheets

U.S. PATENT DOCUMENTS

| | | | | |
|---|---|---|---|---|
| 2,680,492 A | | 6/1954 | Kopp | |
| 2,700,537 A | | 1/1955 | Pennington | |
| 2,946,201 A | | 7/1960 | Munters | |
| 3,042,383 A | * | 7/1962 | Pennington | 165/59 |
| 3,119,673 A | | 1/1964 | Asker et al. | |
| 3,125,157 A | | 3/1964 | Munters et al. | |
| 3,144,901 A | * | 8/1964 | Meek | 165/66 |
| 3,251,402 A | * | 5/1966 | Glav | 165/66 |
| 3,368,327 A | | 2/1968 | Munters et al. | |
| 3,398,510 A | * | 8/1968 | Pennington | 165/66 |
| 3,774,374 A | * | 11/1973 | Dufour et al. | 62/94 |
| 3,844,737 A | | 10/1974 | Macriss et al. | |
| 3,880,224 A | * | 4/1975 | Weil | 62/94 |
| 3,977,466 A | * | 8/1976 | Johansson | 165/59 |
| 4,113,004 A | * | 9/1978 | Rush et al. | 165/66 |
| 4,134,743 A | * | 1/1979 | Macriss et al. | 55/390 |
| 4,180,985 A | | 1/1980 | Northrup, Jr. | |
| 4,235,608 A | | 11/1980 | Watanabe et al. | |
| 4,341,539 A | | 7/1982 | Gidaspow et al. | |
| 4,513,809 A | | 4/1985 | Schneider et al. | |
| 4,536,198 A | | 8/1985 | Strain | |
| 4,574,872 A | | 3/1986 | Yano et al. | |
| 4,594,860 A | * | 6/1986 | Coellner et al. | 62/271 |
| 4,729,774 A | * | 3/1988 | Cohen et al. | 55/269 |
| 4,769,053 A | | 9/1988 | Fischer, Jr. | |
| 4,887,438 A | | 12/1989 | Meckler | |
| 4,926,618 A | | 5/1990 | Ratliff | |
| 4,952,283 A | | 8/1990 | Besik | |
| 5,069,272 A | | 12/1991 | Chagnot | |
| 5,078,208 A | | 1/1992 | Urch | |
| 5,148,374 A | | 9/1992 | Coellner | |
| 5,179,998 A | | 1/1993 | Des Champs | |
| 5,183,098 A | | 2/1993 | Chagnot | |
| 5,193,610 A | | 3/1993 | Morissette et al. | |
| 5,238,052 A | | 8/1993 | Chagnot | |
| 5,353,606 A | * | 10/1994 | Yoho et al. | 62/271 |
| 5,373,704 A | | 12/1994 | McFadden | |
| 5,426,953 A | | 6/1995 | Meckler | |
| 5,542,968 A | * | 8/1996 | Belding et al. | 96/153 |
| 5,584,916 A | | 12/1996 | Yamashita et al. | |
| 5,620,367 A | | 4/1997 | Khelifa | |
| 5,632,954 A | * | 5/1997 | Coellner et al. | 62/94 |
| 5,725,639 A | | 3/1998 | Khelifa et al. | |
| 5,732,562 A | | 3/1998 | Moratalla | |
| 5,752,323 A | | 5/1998 | Hashimoto et al. | |
| 5,761,915 A | * | 6/1998 | Rao | 62/94 |
| 5,782,104 A | * | 7/1998 | Sami | 62/94 |
| 5,791,153 A | | 8/1998 | Belding et al. | |
| 5,826,434 A | | 10/1998 | Belding et al. | |
| 5,826,641 A | | 10/1998 | Bierwirth et al. | |
| 5,829,513 A | | 11/1998 | Urch | |
| 5,839,288 A | | 11/1998 | Dotson | |
| 5,887,784 A | * | 3/1999 | Haas | 236/44 A |
| 5,937,667 A | * | 8/1999 | Yoho, Sr. | 62/271 |
| 5,938,523 A | | 8/1999 | Khelifa et al. | |
| 6,029,467 A | | 2/2000 | Moratalla | |
| 6,083,300 A | * | 7/2000 | McFadden | 96/150 |
| 6,131,653 A | | 10/2000 | Larsson | |
| 6,141,979 A | | 11/2000 | Dunlap | |
| 6,178,762 B1 | * | 1/2001 | Flax | 62/271 |
| 6,199,388 B1 | * | 3/2001 | Fischer, Jr. | 62/94 |
| 6,199,394 B1 | * | 3/2001 | Maeda | 62/271 |
| 6,209,622 B1 | * | 4/2001 | Lagace et al. | 165/8 |
| 6,328,095 B1 | * | 12/2001 | Felber et al. | 165/54 |
| 6,355,091 B1 | * | 3/2002 | Felber et al. | 95/10 |

OTHER PUBLICATIONS

U.S. patent application Ser. No. 09/518,923 (filed Mar. 6, 2000).

U.S. patent application Ser. No. 09/519,516 (filed Mar. 6, 2000).

U.S. patent application Ser. No. 09/519,870 (filed Mar. 6, 2000).

* cited by examiner

VENTILATING DEHUMIDIFYING SYSTEM

Reference is made to the following copending patent applications all of which were filed on the same date as the present application, and all of which are incorporated in the present application as if fully set forth herein: Ventilating Dehumidifying System Using A Wheel for both Heat Recovery and Dehumidification, application Ser. No. 09/518,924; Heat Recovery Ventilator With Make-up Air Capability, application Ser. No. 09/518,923; Ventilating Dehumidifying System Using A Wheel Driven by Variable Speed Pulsing Motor, application Ser. No. 09/519,516; Dehumidifier Using Non-Rotating Desiccant Material, application Ser. No. 09/519,870.

BACKGROUND OF THE INVENTION

The present invention relates to air ventilation and an improved air ventilation system which includes dehumidification.

ANSI/ASHRAE Standard 62-1989 was established to address the need for increased ventilation of buildings due to poor indoor air quality. Increased levels of contaminants from humans, fuel burning appliances, building materials and furnishings have resulted from the current construction practices which produce tighter, low leakage buildings. For example, studies have identified volatile organic compounds (VOCs) such as formaldehyde, continued exposure to which can cause illness and which can buildup in poorly ventilated spaces. Recommended ventilation rates range from about 0.3 air changes per hour to over 1.0 air changes per hour. The actual level of recommended outdoor air intake depends on the use, size and occupancy of the building.

Indoor air quality is also affected by the presence of living organisms in the circulated air. Bacteria, mold and mildew, for example, thrive on the damp air in air conditioning ducts. For this reason, reduction of humidity levels is not only a comfort concern but also a health concern. Homeowners can reduce their exposure to harmful bacteria, mold and mildew by regulating the humidity level within their homes.

Homeowners also are becoming more aware of the importance of including air ventilation systems within their homes. Therefore, there exists a need for smaller, less complex, less expensive ventilation and dehumidification systems that are appropriate for residential use.

Many dehumidifiers currently in use rely on refrigerated cooling coils or compression elements to dehumidify. Such refrigerating coils increase the complexity and expense of the units as well as the input energy necessary to operate the system. Dehumidification can be achieved with less expense by using desiccant materials. Desiccant materials can either absorb or adsorb moisture and then expel that moisture without the need for cooling coils.

Ventilators that use desiccant materials to dehumidify often suffer from freezing during use in winter or cold weather. Such freezing occurs when the outside fresh air being supplied to the system freezes moisture and condensation on the desiccant wheel or block. When this happens, prior art devices typically shut off the supply of fresh air and re-circulate warm air through the system until the desiccant defrosts. Such a prior art process has the disadvantage of interrupting the ventilating function of the device while the desiccant defrosts.

Dehumidifiers using desiccants typically shape the desiccant as a wheel. By rotating the wheel, which intersects two separate air streams, the desiccant material continually adsorbs moisture from one air stream and expels the moisture to the second air stream. It is important to keep the two air streams separate; otherwise contaminants from the exhaust air will mix with the incoming fresh dehumidified air. Therefore, the device must be carefully constructed to minimize mixing pollutants from the exhaust air stream with the fresh air.

U.S. Pat. No. 5,179,998, assigned to Deschamps Laboratories, Inc. discloses a heat recovery ventilating dehumidifier which provides fresh, cool, low relative humidity air to a building or room during warm weather, and warm fresh air during cold weather. Fresh air is drawn into the heat recovery ventilating dehumidifier, cooled and dehumidified by heat exchange by exhausting stale air in a first heat exchanger, then further cooled and dehumidified by passage through a refrigerant coil.

U.S. Pat. No. 5,193,610 to Morissette et al. relates to an apparatus for defrostable ventilation systems using warm interior air as defrost air for defrosting the system during cool weather. In particular, the patent describes an apparatus whereby, during a defrost cycle, the interior defrost air may circulate through both of the fresh air and exhaust air paths for delivery back into the building, i.e., the warm interior air may be confined to circulate from the interior of the building into the ventilation apparatus and back to the interior of the building.

SUMMARY OF THE INVENTION

In accordance with the present invention there is provided a ventilation and dehumidification system for ventilating fresh air to a conditioned space. The system is comprised of a desiccant wheel for dehumidifying incoming air by exchanging moisture from an inflow current of air with an outflow current of air. The desiccant wheel is both regenerated and defrosted by a regenerative heater which is placed to heat the outflow current of air before the outflow current passes through the desiccant wheel. The system includes blowers in order to motivate the inflow and outflow currents of air. The system may also include heat recovery means such as a heat transfer wheel or a motionless heat transfer core. The blowers can be arranged so as to create an air pressure differential between the inflow chamber and the outflow chamber so that any leakage of air between the two chambers will occur from the inflow chamber to the outflow chamber.

DETAILED DESCRIPTION

Figure 1:
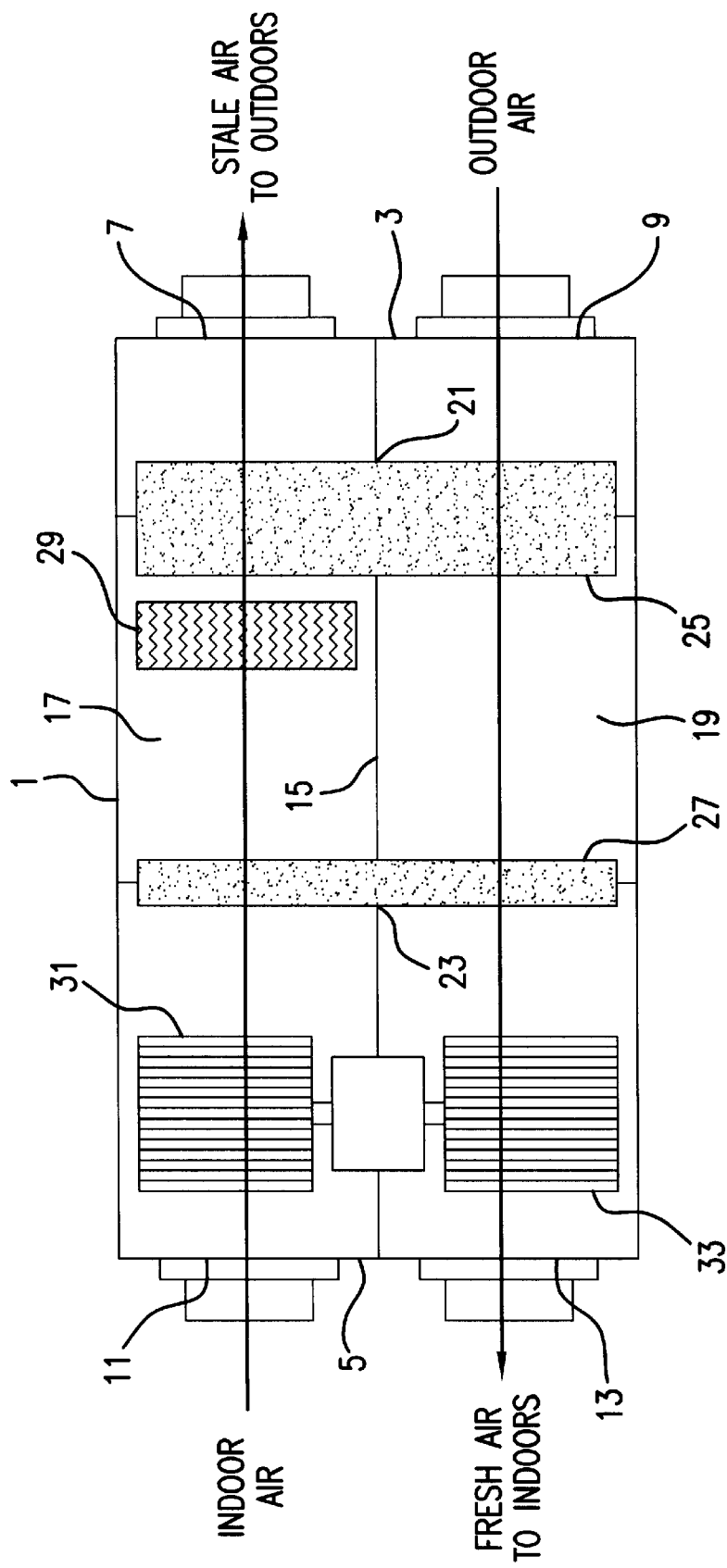
FIG. 1 shows an embodiment of a system which utilizes a heat recovery wheel.

Referring to the drawings, FIG. 1 shows one preferred embodiment of the system contained within a single appliance for economically ventilating and dehumidifying a conditioned space. The system comprises a unit housing 1 typically made of sheet metal or plastic, having both a back panel 3 and a front panel 5. The unit housing 1 is generally rectangular with back panel 3 and front panel 5 making up opposite sides of the rectangular unit housing 1.

Within the back panel 3 there are two apertures, the first aperture being an outdoor exhaust aperture 7, and the second aperture being an outdoor intake aperture 9. The outdoor exhaust aperture 7 is in communication with outdoor air. Alternatively the outdoor exhaust aperture may be configured to be in communication with other piping or ductwork which itself is in communication with outside air. The outdoor intake aperture 9 is also in fluid communication with outdoor air or other ductwork which is itself in communication with outside air. The outdoor exhaust aperture 7 functions as a port through which stale air is expelled from the system to the outside. Meanwhile, the outdoor intake aperture 9 functions as a port through which the system obtains fresh air to be supplied to the conditioned space.

Within the front panel 5 there are two apertures, an indoor intake aperture 11 and an indoor exhaust aperture 13. Both the indoor intake aperture 11 and the indoor exhaust aperture 13 are in fluid communication with the indoor air of the conditioned space or other piping which is itself in communication with indoor air. The indoor intake aperture 11 functions as a port through which stale air from the conditioned space is supplied to the system. The indoor exhaust aperture 13 is a port through which fresh, dehumidified air is supplied from the system to the conditioned space.

Within the interior of the unit housing 1, there is a divider wall 15 which acts with the unit housing 1 and the back panel 3 and the front panel 5 to define an outflow chamber 17 and an inflow chamber 19. The inflow chamber 19 is in fluid communication with the outdoor intake aperture 9 and the indoor exhaust aperture 13, thereby allowing an inflow current of air to flow from the outdoor intake aperture 9 through the inflow chamber 19 and out the indoor exhaust aperture 13. The outflow chamber 17 is in fluid communication with the outdoor exhaust aperture 7 and the indoor intake aperture 11 thereby allowing an outflow current of air to flow from the indoor intake aperture 11 through the outflow chamber 17 and out the outdoor exhaust aperture 7. The divider wall 15 defines at least one wheel aperture 21. In an alternative embodiment the divider wall 15 defines a second wheel aperture 23 as is shown in FIG. 1.

The first wheel aperture 21 in the divider wall 15 allows the rotating desiccant wheel 25 to pass through the divider wall 15. The embodiment shown in FIG. 1 includes a heat recovery wheel 27 which passes through the second wheel aperture 23. Both the rotating desiccant wheel 25 and the heat recovery wheel are placed within both the outflow chamber 17 and the inflow chamber 19 so that their axes of rotation are substantially parallel to the flow of both the inflow current of air and the outflow current of air.

The rotating desiccant wheel 25 operates by adsorbing moisture from the inflow current of air within the inflow chamber 19. Then, by rotation of the wheel, the portion of the wheel containing the moisture passes to the outflow chamber 17 where the moisture is expelled to the outflow current of air. By heating the outflow current of air before it passes through the desiccant, the regenerative heater 29 encourages expulsion of moisture from the rotating desiccant wheel 25. As the rotating desiccant wheel 25 spins, it continually adsorbs moisture from the inflow current of air in the inflow chamber 19 and subsequently expels that moisture in the outflow chamber to the outflow air current, thereby dehumidifying the inflow current of air.

The rotating desiccant wheel 25 is typically formed of a substrate on which desiccant material has been coated or impregnated. Substrate examples include fiberglass, paper, aluminum, and titanium. In one preferred embodiment, the substrate comprises fiberglass. The desiccant may comprise a silica gel. Desiccant wheels are known in the art and are commercially available. One preferred embodiment uses a Tigel Amorphous Silica Gel Desiccant Wheel Model # 30612-01 manufactured by Munters Corporation. For example, a desiccant wheel 14⅛" in diameter and 3.65" thick is able to remove 100 pints of moisture per day at an outside air temperature of 80° Fahrenheit, at 60% relative humidity, and at an airflow rate of 200 cubic feet per minute. The most efficient speed to rotate the wheel depends upon the size and configuration of the system and the wheel, but for a wheel as just described the efficient speed would be about 20 revolutions per hour.

Outflow chamber 17 may be configured to include a regenerative heater 29 placed near enough the rotating desiccant wheel 25 in order to regenerate or dry the rotating desiccant wheel when in operation. The regenerative heater 29 could be constructed using an electric heating element, hot water elements, or, as in one preferred embodiment, a natural gas burner such as is commonly found in clothes dryers.

The regenerative heater 29 may be configured and positioned to defrost the desiccant wheel during ventilation. In cold climates, the moisture collecting on the desiccant wheel 25 can become frozen. In such situations, prior art ventilation systems typically close off the outside air intake and recycle warm interior air through the system until the desiccant wheel defrosts. The present system, however, may be configured to use the heat output of the regenerative heater 29 in order to defrost the desiccant wheel without stopping or interrupting the ventilation process. Both the ventilation and defrost modes of the system can operate simultaneously.

In order to power the desiccant wheel 25 a motor assembly 24 typically is included in the system. The motor assembly 24 may comprise a simple electric motor. For a desiccant wheel of the size described above, a 120 volt, 0.2A AC motor with 75 oz-in starting torque may be used in conjunction with a belt assembly or friction rollers to rotate the desiccant wheel 25. Alternatively, the motor may be configured to rotate the center shaft of the wheel directly.

The embodiment shown in FIG. 1 is configured to include a heat recovery or heat transfer wheel 27. The heat recovery wheel 27 transfers heat between the inflow and outflow currents of air. The heat transfer wheel 27 is placed within both the outflow chamber 17 and the inflow chamber 19 so that its axis of rotation is substantially parallel to the flow of both the inflow current of air and the outflow current of air. As a portion of the heat transfer wheel 27 passes through the warmer of the two interior chambers 17 and 19, that portion of the wheel gains heat. Subsequently, when the same portion of the heat transfer wheel 27 passes through the cooler of the two chambers, the heat is lost from the wheel. Therefore, in warm weather the heat transfer wheel 27 transfers heat from the inflow current of air to the outflow current of air, thereby conserving energy necessary to cool the conditioned space. In cold weather the heat transfer wheel 27 transfers heat from the outflow current of air to the inflow current of air, thereby reducing heating costs.

Heat recovery wheels are known in the art. The most efficient speed at which to rotate the heat recovery wheels depends on the size and configuration of the system. A typical speed for a 14⅛" diameter, 3.65" thick wheel would be about 20 revolutions per minute (1200 revolutions per hour). An appropriate electric motor, such as the one discussed above for the desiccant wheel 25, is needed to power the heat recovery wheel 27.

Within the outflow chamber, there is an exhaust blower 31 which moves the outflow current of air from the indoor intake aperture 11 past the heat recovery wheel 27 through the outflow chamber 17 past the regenerative heater 29 past the rotating desiccant wheel 25 and out the outdoor exhaust aperture 7. Similarly, within the inflow chamber 19 there is an intake blower 33 which moves the inflow current of air from the outdoor intake aperture 9 past the rotating desiccant wheel 25 past the heat recovery wheel 27 and out the indoor exhaust aperture 13. Blowers 31 and 33 may comprise squirrel cage blowers, axial fans, propellers and other devices capable of creating a current of air. For a device using desiccant and heat recovery wheels as described above blowers 31 and 33 typically may be configured to move 200 cubic feet per minute at 0.1 inches of water column pressure. Fasco Motors Group manufactures blowers suitable for this purpose.

Blowers 31 and 33 can be arranged so that they are powered by the same motor. Such a configuration prevents either blower from operating independently without the other blower. Therefore, depending on the size of the blowers and the configuration of the system the inflow current of air will be approximately equal to the outflow current of air, preserving the relative pressure of the conditioned space with the outside air.

Additionally the blowers 31 and 33 can be arranged (not shown in FIG. 1) so that there exists a pressure bias between the outflow chamber 17 and the inflow chamber 19. By placing the exhaust blower 31 and the intake blower 33 near the back panel 3, the outflow current of air is essentially pulled from the indoor intake aperture 11 to the outdoor exhaust aperture 7, whereas the inflow current of air is pushed from the outdoor intake aperture 9 to the indoor exhaust aperture 13. Because the inflow current of air is pushed through the system while the outflow current of air is pulled through the system, there exists a pressure bias between the inflow and outflow chambers 17 and 19. Such a bias prevents stale, contaminated air from leaking out of the outflow chamber 17 and into the inflow chamber 19. Instead, to the extent there exists openings between the inflow and outflow chamber 17 and 19, the inflow current of air will be forced to leak into the outflow chamber 17 by the difference in air pressures.

In the embodiment shown in FIG. 1, the regenerative heater 29, the rotating heat transfer wheel 27, and the rotating desiccant wheel 25 can be operated independently of each other thereby allowing several different modes of operation for the system. When the exhaust blower 31 and the intake blower 33 are on and the desiccant wheel 25 and regenerative heater 29 are off and the heat recovery wheel 27 is on, the system will function as a heat recovery ventilator which ventilates the conditioned space and recovers heat in order to save energy. Alternatively, the system can be operated in a second mode where the exhaust blower 31 and the intake blower 33 are on, the desiccant wheel 25 and the regenerative heater 29 are on while the heat transfer wheel 27 is off so that the system functions as a dehumidifier and ventilator with little heat transfer between the inflow current of air and the outflow current of air. In addition, the system can operate in a mode where the intake blower 33 and the exhaust blower 31 are on, the desiccant wheel 25 is on, the regenerative heater 29 is on and the heat recovery wheel 27 is on so that the system functions as a ventilator with dehumidification as well as heat recovery. In addition, the system can operate without either the heat recovery wheel 27 or the rotating desiccant wheel 25 or the regenerative heater 29 on so that the system operates as a simple ventilator.

Figure 2:
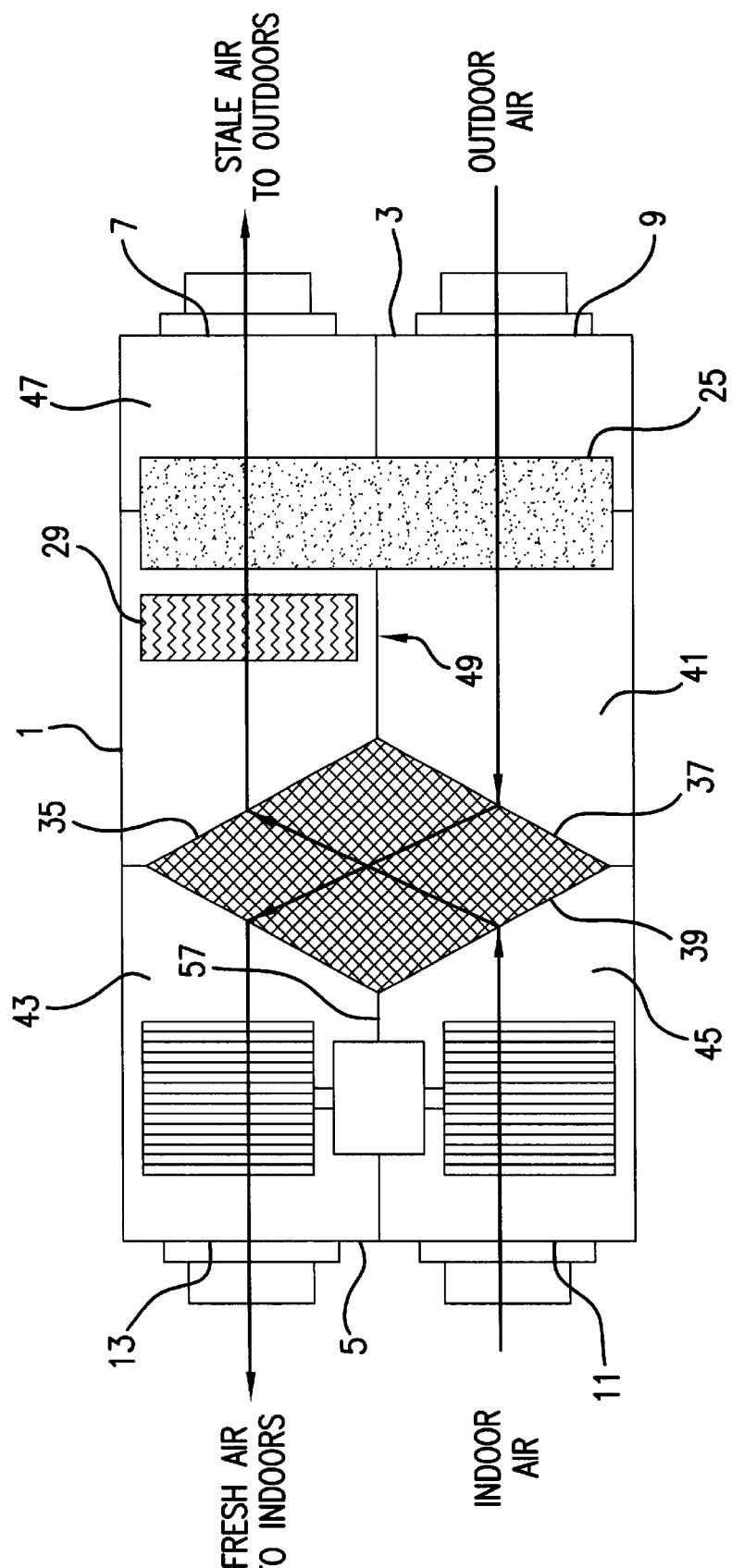
FIG. 2 shows an embodiment of a system which utilizes a heat transfer core.

Referring now to FIG. 2, the heat transfer function of the ventilator can be performed by a motionless heat transfer core 35 which does not spin like the heat recovery wheel 27 of FIG. 1. Instead, the heat transfer core 35 of FIG. 2 is a stationary block which is permeated by two sets of channels, an inflow set of channels 37 and an outflow set of channels 39. The inflow set of channels 37 are in fluid communication with the first inflow chamber 41 and the second inflow chamber 43. The outflow set of channels 39 in the heat transfer core 35 are in fluid communication with the second outflow chamber 45 and the first outflow chamber 47. Therefore, in this embodiment the inflow current of air and the outflow current of air exchange heat as the two currents pass in close proximity through the channels of the heat transfer core 35. In the embodiment shown in FIG. 2, the heat recovery function cannot be turned off. Therefore, although such a unit is less expensive and less prone to breakdown due to fewer moving parts, the embodiment shown in FIG. 2 has fewer operating modes.

The heat transfer core 35 may be comprised of many different materials as is known in the art. Examples include paper, fiberglass, and the same materials as the desiccant wheels of FIG. 1. The heat transfer core 35 typically is formed to fit the shape of the unit housing. The heat transfer core 35 may also be configured to separate the divider wall into two portions a front wall portion 57 and a back wall portion 49.

Figure 3:
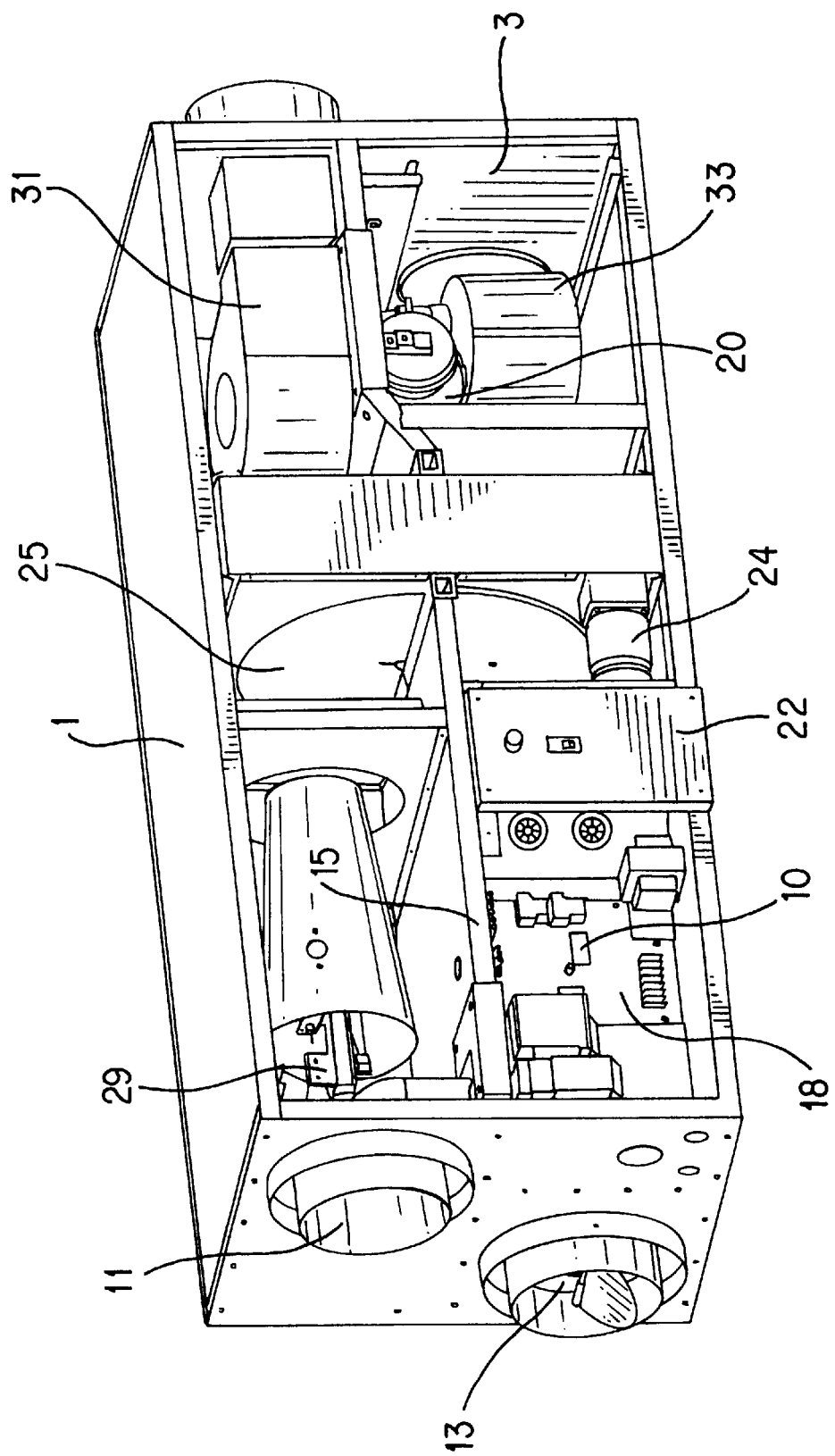
FIG. 3 shows a left perspective view of one embodiment of the present system with a side panel of the unit housing removed to expose an interior view of the system.
Figure 4:
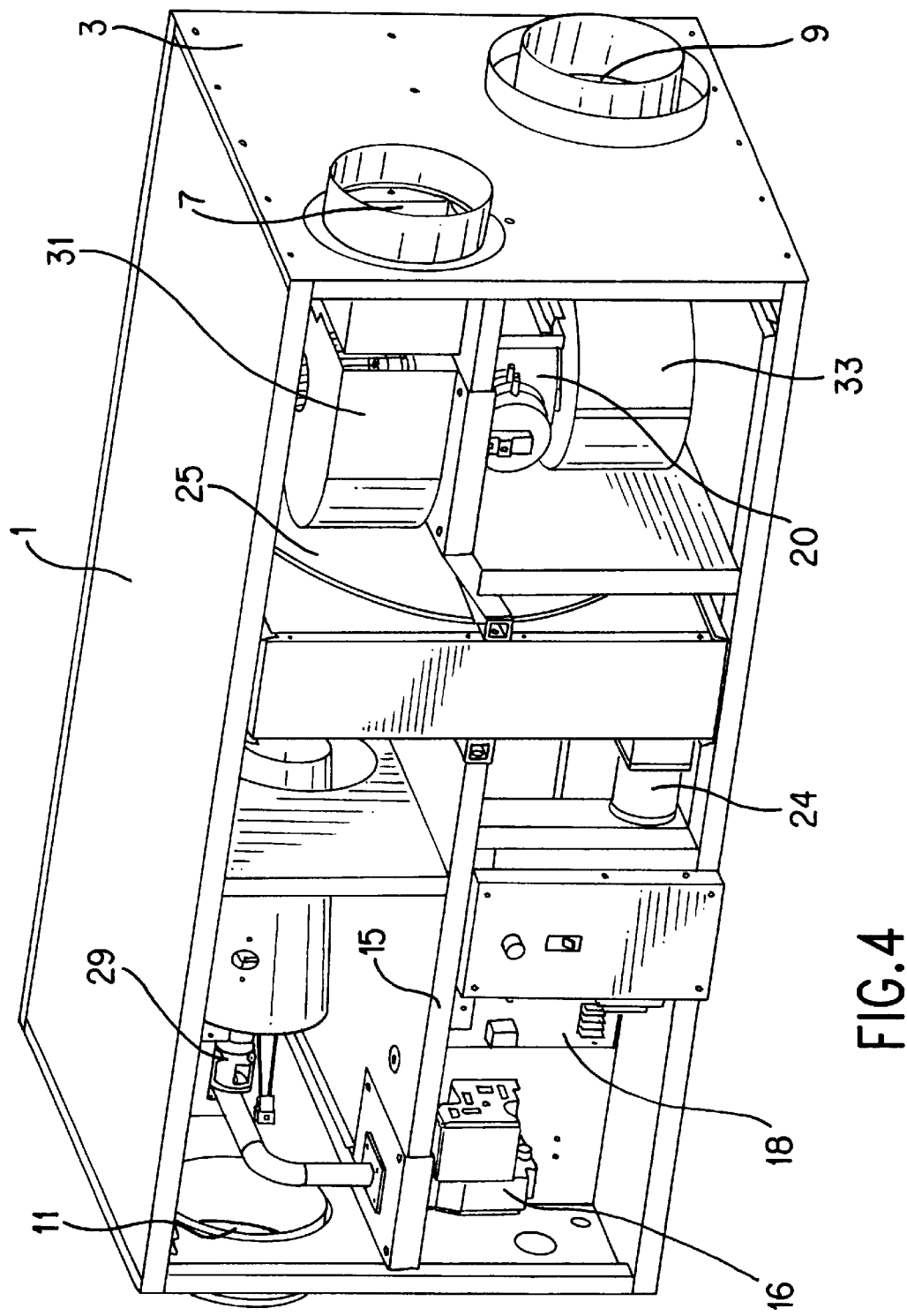
FIG. 4 shows a right perspective view of the embodiment shown in FIG. 3.

FIG. 3 and FIG. 4 show one embodiment of the present system configured to include only the desiccant wheel 25 without the heat transfer wheel 27. The desiccant wheel 25 is coupled to the motor assembly 24. The blowers 31 and 33 are configured to be operated by a single blower motor 20. The blowers 31 and 33 are also arranged to create a pressure bias between the inflow chamber and the outflow chamber as discussed above. The embodiment shown in FIG. 3 and FIG. 4 includes a regenerative heater 29 which typically is a gas burner with gas regulator 16. A wiring board 18 on which may be disposed a controller logic unit 10 is also shown.

Figure 7:
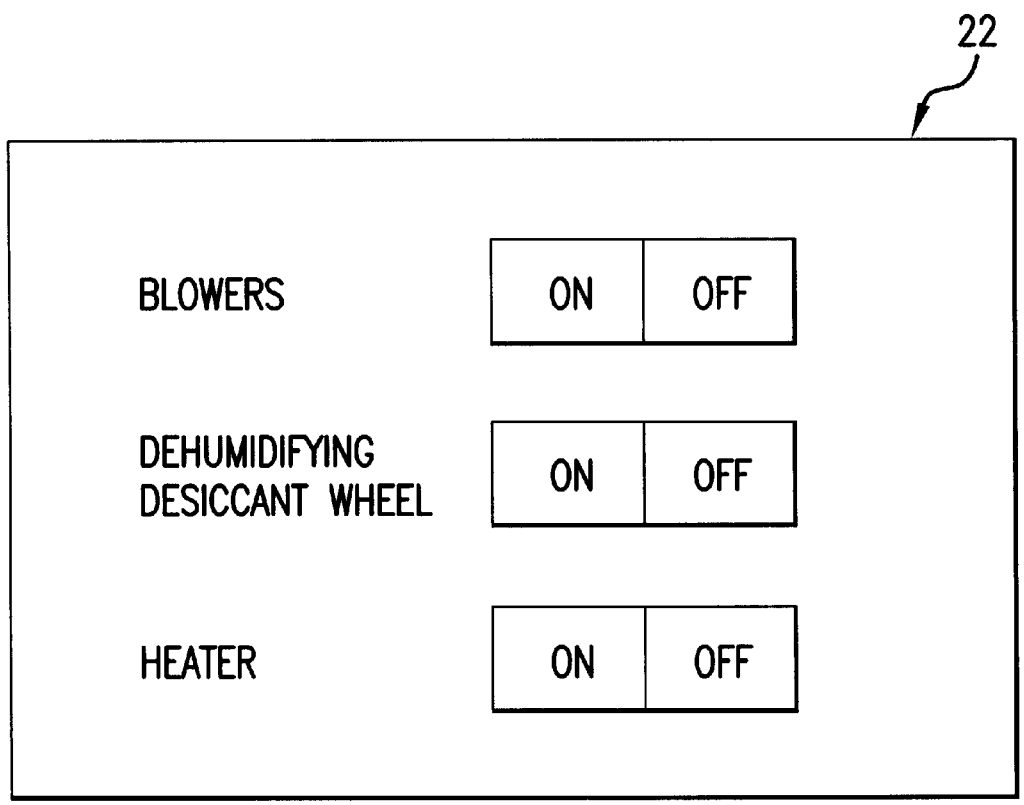
FIG. 7 is a schematic diagram of a cotrol panel.

One embodiment of the present system includes a control panel 22 shown in FIG. 7 which may be configured to enable the user to select the desired mode from the above modes by turning the various elements on or off as desired.

Figure 5:
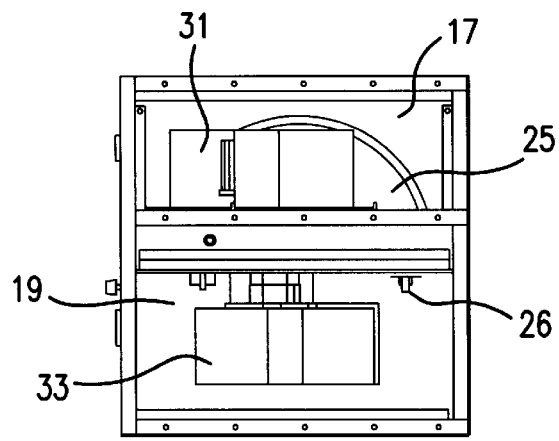
FIG. 5 shows an back view of one embodiment of the system with a back panel removed to expose the interior of the system.
Figure 6:
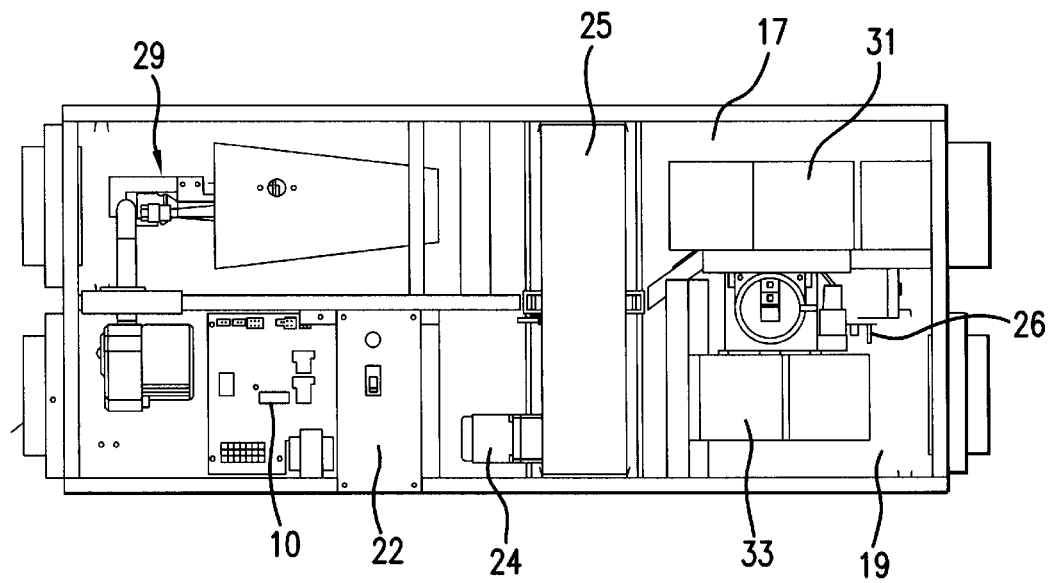
FIG. 6 shows a side view of the embodiment shown in FIG. 3.

Another embodiment of the system includes both thermisters and RH sensors to measure the temperature and humidity inside and outside the conditioned space. FIG. 5 and FIG. 6 show an embodiment configured with a sensor 26 within the inflow chamber 19 for detecting the condition of the inflow current of air. The system may also or alternatively be electrically connected to the home thermostat for monitoring indoor air conditions. When sensor 26 is coupled to a controller logic unit 10 the system may be configured to select automatically the preferred operating mode that will most efficiently achieve desired temperature and humidity levels.

Acceptable thermisters and RH sensors are commercially available and can be ordered from Stetron International, Inc. and TDK USA Corp. The controller logic unit could be any programmable microprocessor such as a Motorola HC705, JP7 micro-controller.

As is evident from the simple design of the above specification, the claimed system not only allows for inexpensive construction, but also permits the unit to be easily replaced with similarly constructed and shaped systems with additional functions, such as air pressure equalization units, heater units, air conditioning units, air filter units or units with combinations of these functions. The present system can be easily installed or removed. In effect, the simple construction of the present system permits modular use which allows greater flexibility at lower costs than a single, complex and expensive unit performing all of the functions listed above.

The above specification, examples and data provide a description of the manufacture and use of the composition of the invention. Many embodiments of the invention can be made without departing from the spirit and scope of the invention as defined by the claims following below.

We claim:

1. A system contained within a single appliance suitable for residential use for economically ventilating and dehumidifying a conditioned space without the need for cooling coils or refrigerants, the system comprising:

a unit housing having both a back and front panel wherein the back panel defines an outdoor exhaust aperture and an outdoor intake aperture, and the front panel defines an indoor exhaust aperture and an indoor intake aperture;

a divider wall disposed within the unit housing and acting with the unit housing to define an outflow chamber and an inflow chamber, wherein the outflow chamber is in communication with the indoor intake aperture and the outdoor exhaust aperture, and wherein the inflow chamber is in communication with the outdoor intake aperture and the indoor exhaust aperture; the divider wall further defining a wheel aperture;

an exhaust blower disposed within the outflow chamber for propelling a stale outflow current of air from the indoor intake aperture through the outflow chamber through the outdoor exhaust aperture;

an intake blower disposed within the inflow chamber for propelling a fresh inflow current of air from the outdoor intake aperture, through the inflow chamber and through the indoor exhaust aperture;

a desiccant wheel rotatably coupled to a desiccant wheel motor assembly, wherein the desiccant wheel passes through the wheel aperture in the dividing wall and is disposed within both the inflow chamber and the outflow chamber with its axis of rotation substantially parallel to the movement of both the inflow and outflow currents of air;

a regenerative heater disposed within the outflow chamber to increase regeneration of the desiccant wheel and to defrost the desiccant wheel;

a control panel adjustable to operate the system in the following modes:
  (a) exhaust and intake blowers ON, desiccant wheel and regenerative heater OFF, so that the system functions as a ventilator;
  (b) exhaust and intake blowers ON, desiccant wheel and regenerative heater ON, so that the system functions as a dehumidifier and ventilator;
  (c) exhaust and in take blowers ON, desiccant wheel ON, regenerative heater ON, so that the regenerative heater increases the temperature in the outflow chamber to defrost the desiccant wheel without interrupting the ventilation function of the system;
  (d) exhaust and intake blowers OFF, desiccant wheel and regenerative heater OFF;

wherein the desiccant wheel intersects both the inflow current of air and the outflow current of air to exchange moisture between the inflow and outflow air currents;

whereby the ventilation function of the system can be employed without dehumidification, or simultaneously with dehumidification; and whereby the system works economically, without the need for cooling coils or refrigerants, both to ventilate and to dehumidify a conditioned space with a desiccant wheel dehumidifier; and further whereby the regenerative heater can defrost the desiccant wheel without interrupting the ventilation function of the system.

2. The system of claim 1 further comprising means for measuring temperatures and humidity inside and outside the conditioned space.

* * * * *